(12) United States Patent
Isayama et al.

(10) Patent No.: US 8,790,213 B1
(45) Date of Patent: Jul. 29, 2014

(54) PLANETARY GEAR UNIT AND WIND TURBINE GENERATOR

(71) Applicant: Mitsubishi Heavy Industries, Ltd., Tokyo (JP)

(72) Inventors: Shuichi Isayama, Tokyo (JP); Hideaki Nishida, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/726,804

(22) Filed: Mar. 25, 2013

(30) Foreign Application Priority Data

Dec. 28, 2011 (JP) ................................. 2011-289996

(51) Int. Cl.
F16H 57/08 (2006.01)
(52) U.S. Cl.
USPC .......................................... 475/346; 475/331
(58) Field of Classification Search
USPC .......... 475/331, 346, 159, 160; 384/192, 276, 384/299, 300
See application file for complete search history.

(56) References Cited

U.S. PATENT DOCUMENTS

| | | | | |
|---|---|---|---|---|
| 1,414,894 A | * | 5/1922 | Phillips | 475/329 |
| 2,127,463 A | * | 8/1938 | Chilton | 475/347 |
| 2,703,264 A | * | 3/1955 | Pitner | 92/187 |
| 4,524,643 A | * | 6/1985 | Ziegler et al. | 475/345 |
| 4,719,818 A | * | 1/1988 | McCreary | 475/159 |
| 5,762,424 A | * | 6/1998 | Harris et al. | 384/299 |
| 7,374,257 B2 | * | 5/2008 | Oertley | 305/136 |
| 8,192,322 B2 | * | 6/2012 | Van Bogaert et al. | 475/331 |
| 8,313,412 B2 | * | 11/2012 | Montestruc | 475/346 |
| 2006/0083451 A1 | * | 4/2006 | Kawagoe et al. | 384/276 |
| 2007/0230846 A1 | * | 10/2007 | Tanaka et al. | 384/276 |
| 2012/0051915 A1 | * | 3/2012 | Suzuki et al. | 416/170 R |
| 2012/0177311 A1 | * | 7/2012 | Isayama et al. | 384/416 |
| 2012/0289375 A1 | * | 11/2012 | Montestruc | 475/347 |

FOREIGN PATENT DOCUMENTS

| | | |
|---|---|---|
| JP | 7293557 A | 11/1995 |
| JP | 2001165247 A | 6/2001 |
| JP | 2005-98365 A | 4/2005 |
| JP | 201147454 A | 3/2011 |
| JP | 2011-127451 A | 6/2011 |
| JP | 2011208610 A | 10/2011 |

OTHER PUBLICATIONS

Office Action mailed Jan. 28, 2014, corresponds to Japanese patent application No. 2011-289996.

* cited by examiner

*Primary Examiner* — Justin Holmes
(74) *Attorney, Agent, or Firm* — Benjamin J. Hauptman; Manabu Kanesaka

(57) ABSTRACT

A planetary gear unit including a ring gear, a sun gear provided on an inner circumferential side of the ring gear, at least one planetary gear arranged between the ring gear and the sun gear to mesh with the ring gear and the sun gear, a planetary pin fixed to a carrier and inserted in a shaft hole of the planetary gear, and a slide bearing arranged between the planetary gear and the planetary pin, wherein the slide bearing is formed of a resin material and is provided on an outer periphery of the planetary pin at least in a region where the planetary pin slides relative to the planetary gear.

15 Claims, 8 Drawing Sheets

PLANETARY GEAR UNIT AND WIND TURBINE GENERATOR

TECHNICAL FIELD

The present invention relates, for instance, to a planetary gear unit used for a step-up gear of a wind turbine generator and to the wind turbine generator.

BACKGROUND ART

A planetary gear unit is commonly known as a power transmission mechanism for reducing or increasing a rotational speed of a rotative power source inputted from a driving power source. The planetary gear unit includes a ring gear having internal teeth, a sun gear with external teeth, and a planetary gear disposed between the ring gear and the sun gear to mesh with the gears.

With the planetary gear unit of this type, a speed increasing/decreasing ratio is high using fewer gears and it is possible to transmit high torque. Thus, the planetary gear unit is widely used as a speed change gear or a speed increasing/decreasing gear. For instance, it is used as a step-up gear in a wind turbine generator. Herein, the wind turbine generator is formed by a hub to which blades are attached, a nacelle for housing the step-up gear and a generator, and a tower for supporting the nacelle. In the wind turbine generator of this type, the planetary gear unit is used as the step-up gear to convert the rotational speed into a speed appropriate for generating power, during transmission of a turning force of the blade to the generator.

As a technique related to this, Patent Literature 1 discloses a gearbox for a wind power generation facility provided with a planetary gear unit. The gearbox is a planetary gear unit having a carrier rotating with a main shaft coupled to the blade and a plurality of planetary pins attached to the carrier. Planetary gears are attached to the planetary pins via slide bearings and a ring gear and a sun gear mesh with the planetary gears. As a result, the rotation of the main shaft causes the planetary gears to both rotate around its axis and revolve around the sun gear so as to output the increased rotation to the sun gear side.

As shown in FIG. 10A and FIG. 10B, in the planetary gear unit 50, the slide bearing 53 is normally attached to an inner periphery of a shaft hole of the planetary gear 52. FIG. 10A is a perspective illustration of the conventional planetary gear and the slide bearing. FIG. 10B is a cross-sectional view of FIG. 10A taken in an axial direction. From a perspective of maintaining slidability between the planetary pin 51 and the slide bearing 53 and also enhancing a life of the bearing, lubricating oil is supplied to a space between the inner periphery of the slide bearing 53 and the outer periphery of the planetary pin 51 to form an oil film on the bearing surface. However, with the use of the slide bearing 53 of this type in the planetary gear unit 50, it is unavoidable that the slide bearing 53 rotating integrally with the planetary gear rotates at a low speed and the planetary pin 51 contacts the slide surface of the slide bearing 53. Therefore, the slide surface of the slide bearing 53 is often made of resin material such as PEEK resin and Teflon (registered trademark) having high heat resistance.

SUMMARY

Technical Problem

In the case where the slide bearing is provided on the planetary gear side as proposed in Patent Literature 1, heat is generated by contact sliding between the inner periphery of the slide bearing and the outer periphery of the planetary pin, shear work of the oil film formed therebetween, and the like. The generated heat is transmitted to surrounding components. In such case, if the slide bearing is made of resin material, which has high heat resistance as well as high thermal insulation, the heat generated on the bearing surface is almost entirely transmitted to the planetary pin side 51 due to the insulation effect of the slide bearing 53 as shown in FIG. 10B. As the heat is trapped on the planetary pin side, the temperature of the planetary pin 51 becomes higher than that of the planetary gear 52. This causes a significant difference of heat expansion rate between the planetary pin 51 and the planetary gear 52. As a result, the clearance disappears between the outer periphery of the planetary pin 51 and the inner periphery of the slide bearing 53 on the planetary gear side 52, which can causes damages to the bearing such as seizing and abrasion.

In view of this, it is an object of the present invention to provide a planetary gear unit and a wind turbine generator which are capable of preventing damages of the bearing such as seizing and light seizing caused by thermal expansion of the bearing.

Solution to Problem

According to embodiments, a planetary gear unit comprises:
a ring gear;
a sun gear provided on an inner circumferential side of the ring gear;
at least one planetary gear arranged between the ring gear and the sun gear to mesh with the ring gear and the sun gear;
a planetary pin fixed to a carrier and inserted in a shaft hole of the planetary gear; and
a slide bearing arranged between the planetary gear and the planetary pin,
and the slide bearing is formed of a resin material and is provided on an outer periphery of the planetary pin at least in a region where the planetary pin slides relative to the planetary gear.

According to the embodiments, the slide bearing formed of the resin material is provided on the outer periphery of the planetary pin. Thus, heat generated at the sliding part of the slide bearing is mainly transmitted to the planetary gear side, hence preventing the temperature of the planetary pin from increasing significantly compared to the planetary gear. Therefore, the heat expansion rate of the planetary pin relative to the planetary gear is reduced, and the clearance between the planetary gear and the slide bearing is maintained. As a result, it is possible to avoid damage to the bearing, which is caused by seizing, abrasion or the like.

In the above planetary gear unit, in either of cases of increasing and decreasing the rotation speed, the load is applied to the planetary pin in the same direction. Thus, the part of the outer periphery of the planetary pin sliding relative to the planetary gear while being subjected to the load is always the same. In view of this, in the embodiments, the slide bearing is provided on the outer periphery of the planetary pin at least in a contact region where the planetary pin slides relative to the planetary gear. Therefore, the slide bearing is positively arranged in the sliding part between the planetary gear and the planetary pin, hence maintaining the slidability in a stable manner. Herein, "the contact region" includes a region where the outer periphery of the slide bearing contacts the inner periphery of the shaft hole of the planetary gear via an oil film. Further, the slide bearing may be provided over the entire periphery or a part of the periphery of the planetary pin.

The above planetary gear unit according further comprises:

a metal sleeve attached to the inner periphery of the shaft hole of the planetary gear, and an inner periphery of the sleeve has a surface roughness that is smaller than a thickness of an oil film of lubricating oil formed between the inner periphery of the sleeve and the slide bearing.

By attaching to the inner periphery of the shaft hole of the planetary gear the metal sleeve whose inner periphery has a surface roughness smaller than the thickness of the oil film of the lubricating oil, it is possible to enhance the slidability between the planetary gear and the slide bearing provided on the planetary pin. Moreover, the gear is generally formed of a rigid material and thus, by forming the sleeve of a material having lower rigidity than the planetary gear, the processing is easy compared to processing the inner periphery of the planetary gear.

In the above planetary gear unit, at least one of an outer periphery of the slide bearing or the inner periphery of the shaft hole of the planetary gear is crowned along an axial direction of the planetary pin.

As a result, even if the planetary gear inclines, it is possible to prevent the slide bearing provided on the planetary pin from partially contacting the inner periphery of the shaft hole of the planetary gear The above planetary gear unit may be of a planetary type, and the slide bearing may be formed of a first part and a second part that are apart from each other, and the first part and the second part of the slide bearing may be disposed on an outer periphery of the planetary pin at both sides in a revolving direction of the planetary pin.

By arranging the slide bearing on a part of the outer periphery of the planetary pin, instead of arranging the slide bearing over the entire periphery of the planetary pin, less resin material is used, thereby reducing the cost. In this case, the slide bearing 23 is provided on the outer periphery of the planetary pin at both sides of the revolving direction. Thus, in both cases of increasing and decreasing the rotation speed, the slide bearing is arranged on the slide surface. As a result, it is possible to maintain superior slidability in a stable manner.

Moreover, a wind turbine generator may comprise the above-described planetary gear unit. As a result, it is possible to avoid damage to the bearing and to operate the wind turbine generator in a stable manner.

Advantageous Effects

According to the embodiments, the slide bearing formed of the resin material is provided on the outer periphery of the planetary pin. Thus, heat generated at the sliding part of the slide bearing is mainly transmitted to the planetary gear side, hence preventing the temperature of the planetary pin from increasing significantly compared to the planetary gear. Therefore, the heat expansion rate of the planetary pin relative to the planetary gear is reduced, and the clearance between the planetary gear and the slide bearing is maintained. As a result, it is possible to avoid damage to the bearing, which is caused by seizing, abrasion or the like.

Moreover, the slide bearing is provided on the outer periphery of the planetary pin at least in the contact region where the planetary pin slides relative to the planetary gear. Therefore, the slide bearing is positively arranged in the sliding part between the planetary gear and the planetary pin, hence maintaining the slidability in a stable manner.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

First Embodiment

Figure 1:
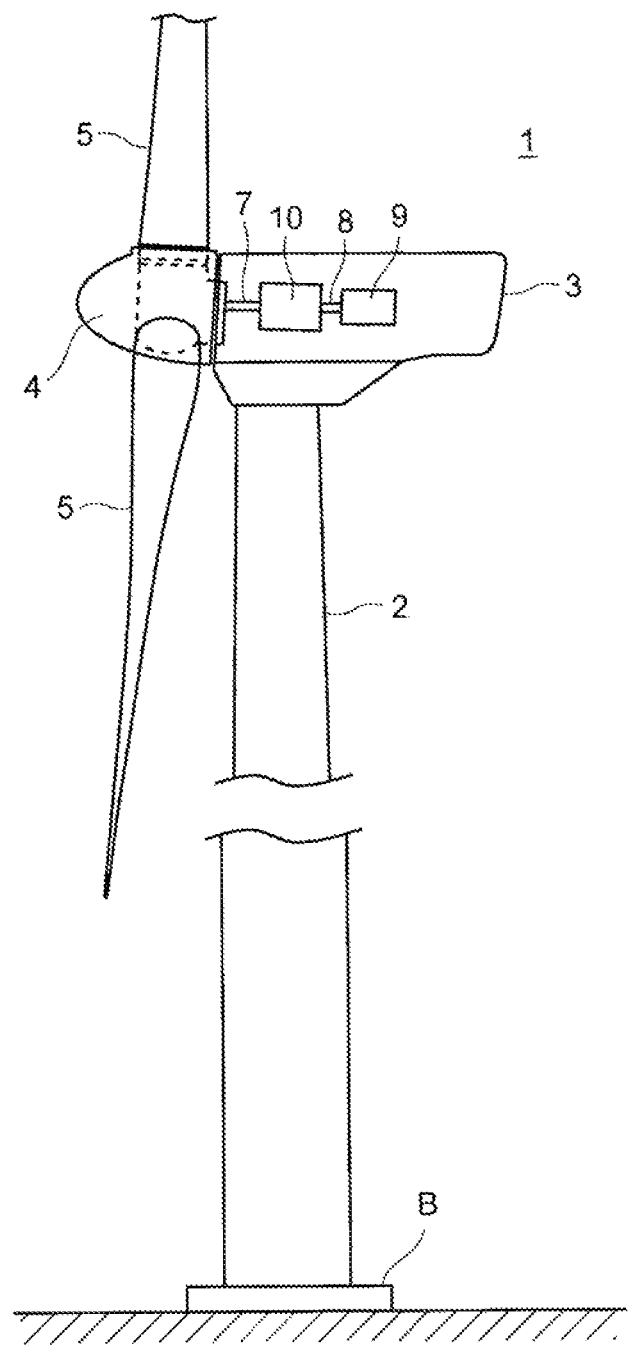
FIG. 1 is a schematic view of a general structure of a wind turbine generator.

A wind turbine generator according to an embodiment of the present invention is described in reference to FIG. 1. Herein, FIG. 1 is a schematic view of a general structure of a wind turbine generator.

As shown in FIG. 1, a wind turbine generator 1 is mainly formed by a tower 2 installed on a base B, a nacelle 3 installed atop the tower 2, a hub 4 attached to the nacelle 3, and a plurality of blades 5 attached to the hub 4.

The tower 2 is a column-shaped structure extending upward from the base B (upward in FIG. 1) and has the nacelle 3 on the top.

The nacelle 3 supports the hub 4 and houses a step-up gear 10 and a generator 8. More specifically, inside the nacelle 3, a main shaft 7 coupled to the hub 4, the step-up gear 10 coupled to the main shaft 7, and the generator 9 coupled to an output shaft 8 of the step-up gear 10 are provided.

The main shaft 7 is coupled to the hub 4 so as to rotate with the blades 5 and the hub 4, and is rotatably fixed to the nacelle side via a main shaft bearing.

The step-up gear 10 is arranged between the main shaft 7 and the generator 9. The step-up gear 10 is configured to increase the rotation inputted from the hub side via the main shaft 7 and to output the increased rotation to the generator 9.

Figure 2:
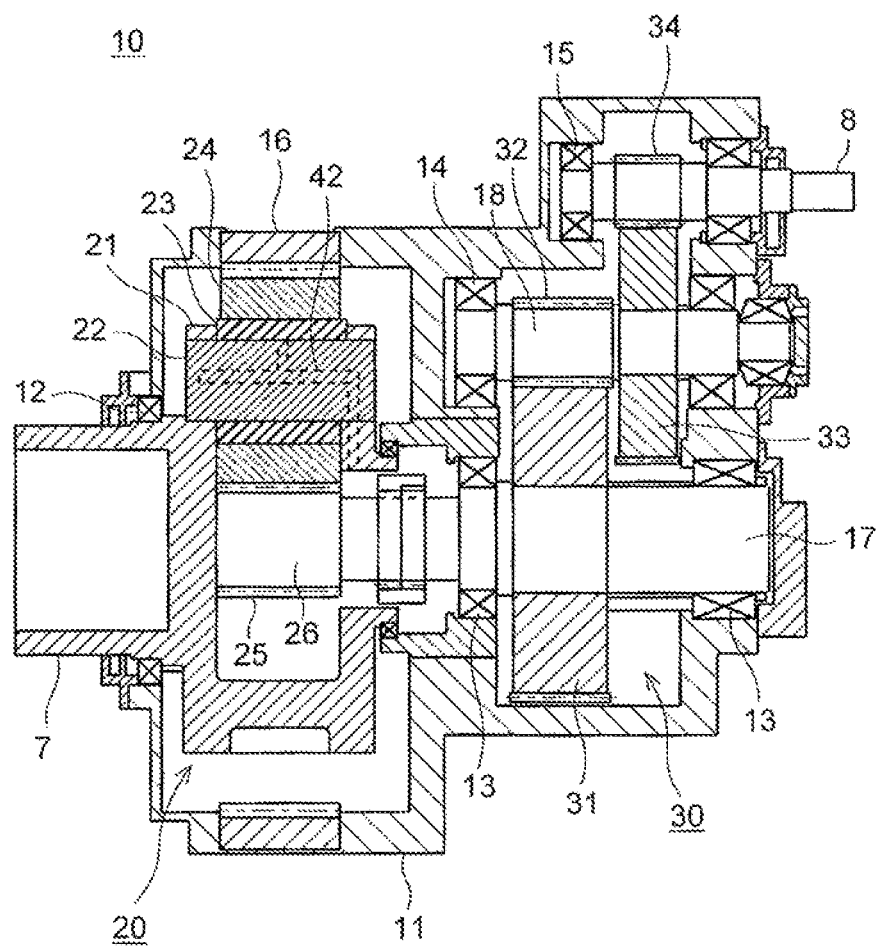
FIG. 2 is a cross-sectional view of an example configuration of a step-up gear for use in a planetary gear unit regarding an embodiment of the present invention.
Figure 3:
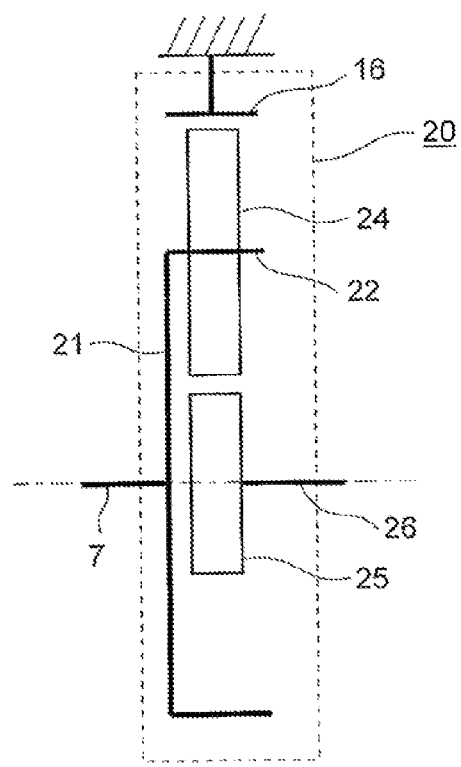
FIG. 3 is a schematic view of a step-up gear of a planetary type.
Figure 4:
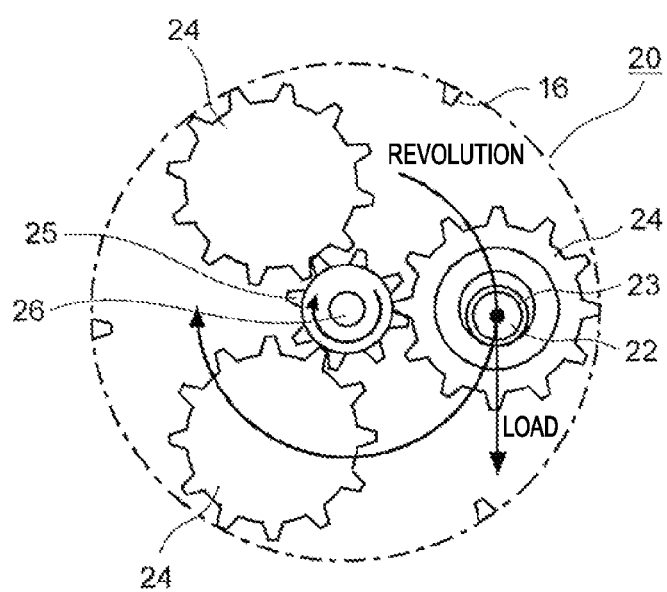
FIG. 4 is a schematic illustration of the step-up gear of the planetary type shown in FIG. 3 taken in an axial direction.

Next, the step-up gear 10 of the wind turbine generator 1 is described in details in reference to FIG. 2 to FIG. 4. FIG. 2 is a cross-sectional view of an example configuration of a step-up gear for use in a planetary gear unit regarding an embodiment of the present invention. FIG. 3 is a schematic view of a step-up gear of a planetary type. FIG. 4 is a schematic illustration of the step-up gear of the planetary type shown in FIG. 3 taken in an axial direction.

The step-up gear 10 is generally configured by combining a plurality of speed-increasing mechanisms. In the step-up gear 10, the rotation of the main shaft 7 is increased through a plurality of speed-increasing mechanisms and ultimately to an output rotation speed of the output shaft 8. The final output shaft 8 of the step-up gear 10 is coupled to the generator side via a coupling (not shown). The planetary gear unit 20 regarding the present embodiment is installed as one of the speed-increasing mechanisms of the step-up gear 10.

As one example, the step-up gear 10 shown in FIG. 2 is configured such that the planetary gear unit 20 for performing a first speed-increasing, and a spur gear unit 30 for performing a second speed-increasing are housed in a casing body 11.

The planetary gear unit 20 includes a carrier 21, a planetary pin 22 held by the carrier 21, a slide bearing 23 attached to the planetary pin 22, a planetary gear supported by the planetary pin 22 via the slide bearing 23, and a ring gear 16 and a sun gear 25 that mesh with the planetary gear 24.

As shown in FIG. 2 and FIG. 4, the carrier 21 is a holding plate for holding a plurality of planetary pins 22 (three planetary pins in this case). The carrier 21 holds the planetary pins 22 by outer cylindrical parts provided at outer peripheries of the planetary pins 22. Thus, the carrier 21 rotates integrally with the mains shaft 7 on the hub side so as to cause the planetary pins 22 attached to the carrier 21 to revolve. Further, the main shaft 7 and the carrier 21 are supported rotatably by a bearing 12.

The slide bearing 23 is a bearing for supporting the planetary gear 24 rotatably to the planetary pin 22. The slide bearing 23 is described later in details.

The planetary gear 24 is supported by the planetary pin 22 via the slide bearing 23 and meshes with the ring gear 16 and the sun gear 25.

The ring gear 16 is provided in the casing body 11 and has internal teeth for meshing with the planetary gear 24. In contrast, the sun gear 25 is surrounded by a plurality of the planetary gears 24 as shown in FIG. 4. Further, a planetary output shaft 26 is fitted in the sun gear 25.

In the planetary gear unit 20 of this type, as shown in FIG. 3 and FIG. 4, upon rotation of the carrier 21 with the main shaft 7, the planetary pins 22 and the planetary gears 24 supported by the planetary pins 22 revolve around the sun gear 25. At the same time, the planetary gears 24 rotate around the planetary pins 22 respectively by work of the slide bearings. As a result, the rotation from the main shaft 7 as an input shaft is increased and then outputted to the planetary output shaft 26. The speed increasing ratio by the planetary gear unit 20 is determined by the number of teeth formed on the planetary gears 24, the ring gear 16 and the sun gear 25.

The spur gear unit 30 shown in FIG. 2 is a speed-increasing mechanism which is optionally provided in addition to the planetary gear unit 20. The rotation of the planetary output shaft 26 is enhanced and then outputted to the final output shaft 8.

The spur gear unit 30 is formed, for instance, by a set of a first spur gear 31 and a second spur gear 32 that mesh with each other, and a set of a third spur gear 33 and a fourth spur gear 34 that mesh with each other as shown in FIG. 2. Herein, the first spur gear 31 is fixed to a first rotation shaft 17 coupled to the planetary output shaft 26, the second spur gear 32 and the third spur gear being fixed to a second rotation shaft 18, the fourth spur gear 34 being fixed to the final output shaft 8. Further, the first rotation shaft 17, the second rotation shaft 18 and the final rotation shaft 8 are rotatably supported by a first bearing 13, a second bearing 14 and a third bearing 15, respectively.

In the spur gear unit 30 of this type, the number of teeth formed on the first spur gear 31 is greater than that on the second spur gear 32. Thus, the rotation of the first rotation shaft 17 coupled to the planetary output shaft 26 on the planetary gear unit side is increased and transmitted to the second rotation shaft 18. Further, number of teeth formed on the third spur gear 33 is greater than that on the fourth spur gear 34. Thus, the rotation of the second rotation shaft 18 is increased and transmitted to the final output shaft 8.

According to the step-up gear 10 having the above structure, the rotation inputted from the main shaft 7 on the hub side is increased at two stages by the planetary gear unit 20 and the spur gear unit 30 and then transmitted to the final output shaft 8 on the generator side.

Figure 5A:
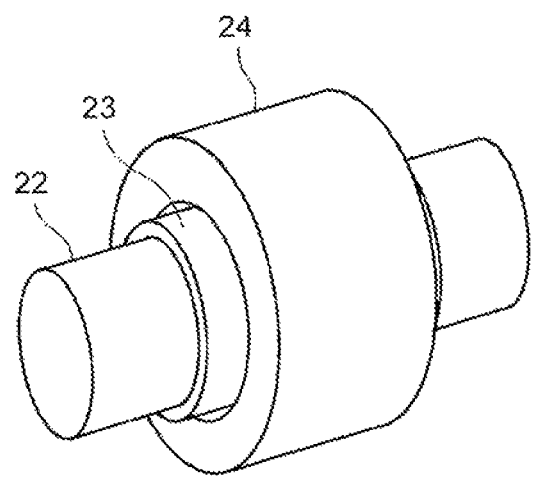
FIG. 5A is an oblique perspective figure of a planetary gear and a slide bearing in a first embodiment of the present invention.
Figure 5B:
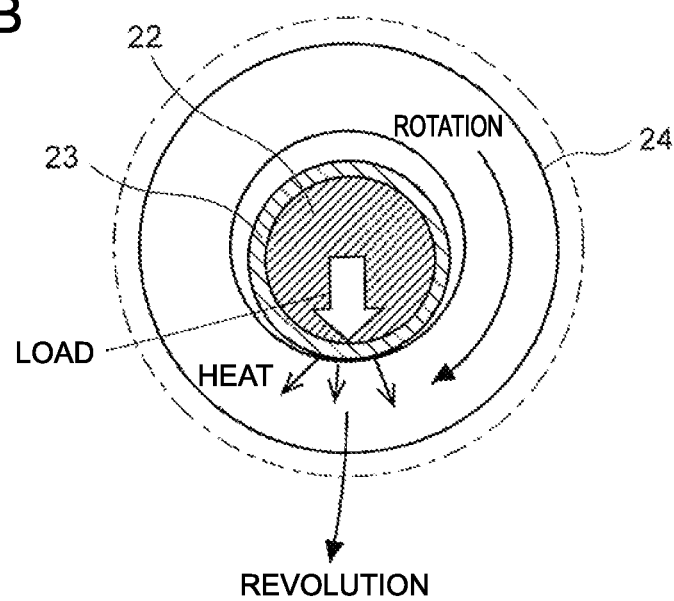
FIG. 5B is a view of the planetary gear and the slide bearing of FIG. 5A taken in the axial direction.

The planetary gear unit 20 is now described in details. FIG. 5A is an oblique perspective figure of the planetary gear 24 and the slide bearing 23 in the first embodiment of the present invention. FIG. 5B is a view of the planetary gear 24 and the slide bearing 23 of FIG. 5A taken in the axial direction.

As shown in FIG. 5A and FIG. 5B, the slide bearing 23 is a cylindrical member formed of a resin material at least on a sliding surface. More specifically, the slide bearing 23 may be a cylindrical member formed solely of a resin material, or may be configured such that a resin is arranged on a surface of a cylindrical bearing body. In the case where the slide bearing 23 is formed solely of the resin material, the slide bearing 23 may be attached to the planetary pin 22 by a variety of methods such as by attaching a resin sheet to the outer periphery of the planetary pin 22 by an adhesive agent, by applying heat, energy wave or the like externally to the resin sheet and welding the resin sheet to the outer periphery of the planetary pin 22, and by press fitting a resin material formed into a sleeve shape into the planetary pin 22. Moreover, in the case where the resin is arranged on the surface of the cylindrical bearing body, the resin may be attached to the surface of the cylindrical bearing body in a manner similar to the above methods. Herein, preferably used as the resin material is a resin having high heat resistance such as PEEK resin, and Teflon (registered trademark).

FIG. 5A and FIG. 5B illustrate the case where the slide bearing 23 is arranged over the entire circumference of the planetary pin 22. However, the slide bearing 23 may be provided on the outer periphery of the planetary pin 22 at least in a contact region where the outer periphery of the planetary pin 22 slides relative to the inner periphery of the shaft hole of the planetary gear 24. Herein, "the contact region" refers to a region where the outer periphery of the slide bearing 23 contacts the inner periphery of the shaft hole of the planetary gear 24 via an oil film.

Figure 6:
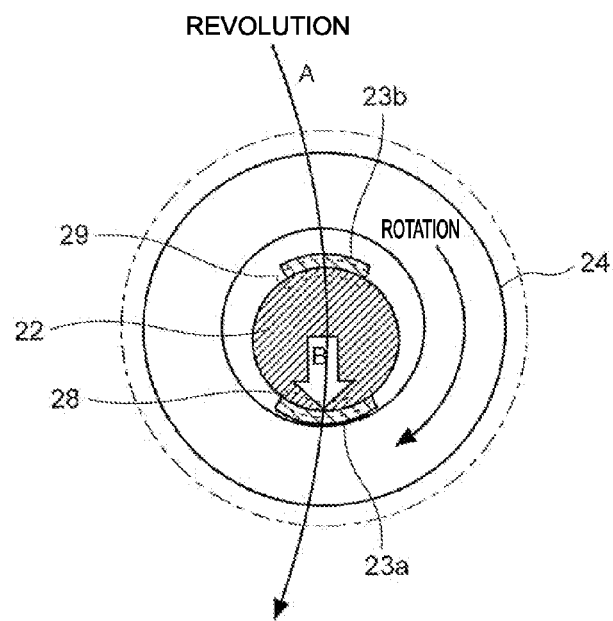
FIG. 6 is an oblique perspective figure of a planetary gear and a slide bearing in a modified case of the present invention.

FIG. 6 is an oblique perspective figure of the planetary gear 24 and the slide bearing 23 in a modified case of the present invention.

In FIG. 6, in the case where the planetary gear unit 20 is of a planetary type, the rotation of the carrier 21 causes the planetary pins 22 to revolve in a direction indicated by an arrow A in FIG. 6. During the speed-increasing by the step-up gear 10, the planetary pin 22 is subjected to the load in a direction indicated by an arrow B in FIG. 6. In such case, as the planetary pins 22 are fixed to the carrier 21, the planetary pins 22 are subjected to the load in the direction of the arrow B at any position in a revolving path of the planetary pins 22. Therefore, during the speed-increasing, the planetary gear 24 slides relative to the inner periphery of shaft hole of the planetary gear 24 in a loaded state in a load region 28 on the speed-increasing side. In contrast, during the speed-reducing, the planetary gear 24 slides relative to the inner periphery of shaft hole of the planetary gear 24 in a loaded state in a load region 29 on the speed-reducing side which is opposite side from the speed-increasing case.

In the modified case, instead of arranging the slide bearing 23 over the entire periphery of the planetary pin 22, the slide bearing 23 is disposed on the outer periphery of the planetary pin 22 at both sides of a revolving direction of the planetary pin 22, which are apart from each other. More specifically, the slide bearing 23 is formed of a first part 23a provided in the load region 28 on the speed-increasing side, and a second part 23b provided in the load region 29 on the speed-reducing side. As a result, the resin material is used less, thereby reducing the cost. In the above case, the slide bearing 23 is provided on the outer periphery of the planetary pin 22 at both sides of the revolving direction. Thus, in both cases of increasing and decreasing the rotation speed, the slide bearing 23 is arranged on the slide surface. As a result, it is possible to maintain superior slidability in a stable manner.

Referring to FIG. 5A and FIG. 5B, there is a space between the planetary pin 22 having the slide bearing 23 on the outer periphery and the inner periphery of the shaft hole of the planetary gear 24. Lubricating oil is supplied to the space.

As a mechanism for supplying the lubricating oil, an oil channel 42 may be formed in the planetary pin 22 as shown in FIG. 2. The lubricating oil is supplied from an oil bath (not shown) below the planetary gear unit 20 to the oil channel 42 and then to the space between the slide bearing 23 and the planetary gear 24 from an oil supply hole through the oil channel 42.

Figure 7:
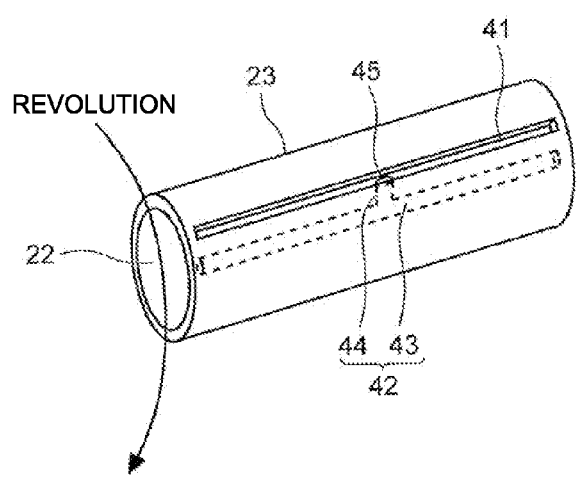
FIG. 7 is an oblique perspective figure of the slide bearing provided with an oil groove.

FIG. 7 is an oblique perspective figure of the slide bearing 23 provided with an oil groove 41.

As shown in FIG. 7, the oil channel 42 is formed, for instance, by a main channel 43 extending along the axial center, and a branched channel 44 extending from the main channel 43 toward the outer periphery of the planetary pin 22 in the radial direction.

Moreover, an oil groove 41 is formed on the outer periphery of the slide bearing 23. One or more oil grooves 41 may be formed in parallel to the axial direction of the slide bearing 23 or may be helically formed. In such case, the oil supply hole 45 is provided at an end of the branched channel of the oil channel 43. The oil supply hole 45 opens to an interior of the oil groove 41. As a result, the lubricating oil supplied from the oil bath via the oil channel 42 is supplied through the oil groove 41 in the axial direction of the slide bearing 23 and then spreads all over the inner periphery of the shaft hole by sliding of the slide bearing 23 relative to the inner periphery of the shaft hole of the planetary gear 24, thereby forming an oil film. The slidability of the slide bearing 23 relative to the planetary gear 24 is improved by the oil film.

In the present embodiment, the above oil groove 41 may be formed on the outer periphery of the slide bearing 23 in a region excluding the load region 28 on the speed-increasing side and the load region 29 on the speed-decreasing side. As a result, it is possible to avoid decline of the slidability between the slide bearing 23 and the planetary gear 24 due to an uneven surface of the oil groove 41.

As described above, in the present embodiment, the slide bearing 23 formed of the resin material is provided on the outer periphery of the planetary pin 22. Thus heat generated at the sliding part of the slide bearing 23 is transmitted to the planetary gear side 24, hence preventing the temperature of the planetary pin 22 from increasing significantly compared to the planetary gear 24. Therefore, the heat expansion of the planetary pin 22 relative to the planetary gear 24 is minimized, and the clearance between the planetary gear 24 and the slide bearing 23 is maintained. As a result, it is possible to avoid damage to the bearing, which is caused by seizing, abrasion or the like.

Second Embodiment

The planetary gear unit 20 according to a second embodiment is described. The same reference numerals are given without adding explanations for those configurations that are the same as the first embodiment. In the present embodiment, only the structure of the planetary gear unit 20 is described but the planetary gear unit 20 is also applicable to the wind turbine generator 1 (see FIG. 1 and FIG. 2) in the same manner as the first embodiment.

Figure 8:
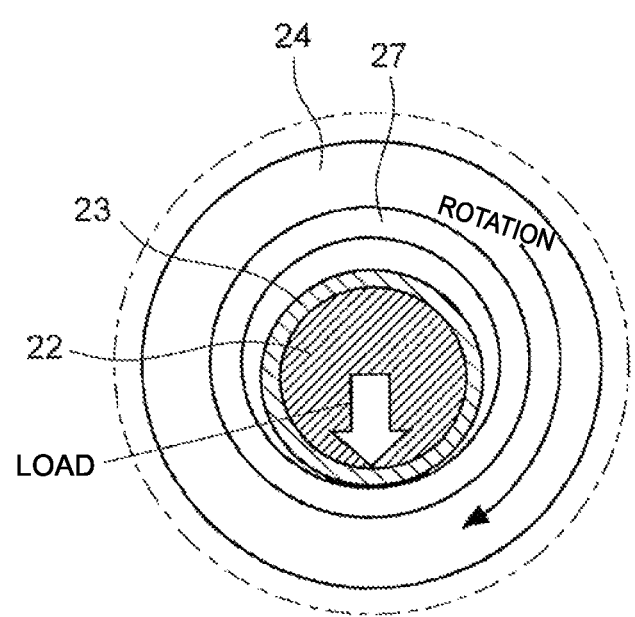
FIG. 8 is an oblique perspective figure of a planetary gear and a slide bearing in a second embodiment of the present invention.

FIG. 8 is an oblique perspective figure of the planetary gear 24 and the slide bearing 23 in a second embodiment of the present invention. As shown in FIG. 8, the planetary gear unit 20 is configured such that a metal sleeve 27 is attached to the inner periphery of the shaft hole of the planetary gear 24.

The sleeve 27 has a cylindrical shape and is fitted into the inner periphery of the shaft hole of the planetary gear 24. The sleeve 27 is provided for the purpose of improving the slidability with respect to the slide bearing 23. Thus, the inner periphery of the sleeve 27 has a smoother surface than the inner periphery of the shaft hole of the planetary gear 24.

The inner periphery of the sleeve 27 has a surface roughness that is smaller than a thickness of an oil film of the lubricating oil formed between the inner periphery of the sleeve and the slide bearing 23.

As described above, by attaching to the inner periphery of the shaft hole of the planetary gear 24 the metal sleeve 27 having the surface roughness smaller than thickness of the oil film, it is possible to improve the slidability between the planetary gear 24 and the slide bearing 23 provided on the planetary pin 22. Moreover, the gear is generally formed of a rigid material and thus, by forming the sleeve 27 of a material having lower rigidity than the planetary gear 24, the processing is easier than processing the surface of the inner periphery of the planetary gear 24.

While the embodiments of the present invention have been described, it is obvious to those skilled in the art that the first embodiment and the second embodiment may be combined as needed and various changes may be made without departing from the scope of the invention.

For instance, in the above embodiments, the planetary gear unit 20 of the planetary type is described. However, this is not limitative and a planetary gear unit of a solar type in which the solar gear is fixed may be sued, or a planetary gear unit of a star type in which the planetary pin 22 is fixed may be used.

In the above first and second embodiments, both the inner periphery of the shaft hole of the planetary gear 24 and the outer periphery of the slide bearing 23 are cylindrical. However, this is not limitative and at least one of the outer periphery of the slide bearing 23 or the inner periphery of the shaft hole of the planetary gear 24 may be crowned along the axial direction of the planetary pin 22.

Figure 9A:
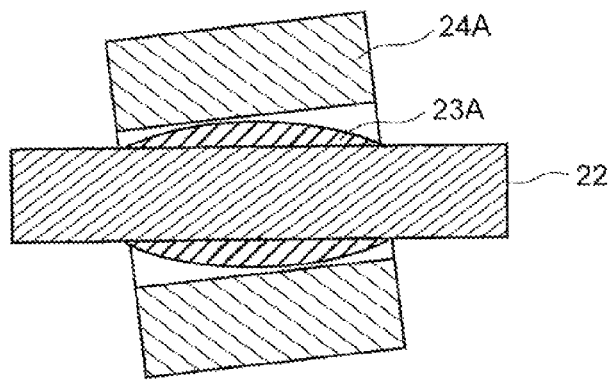
FIG. 9A is a cross-sectional view of a crowned slide bearing.
Figure 9B:
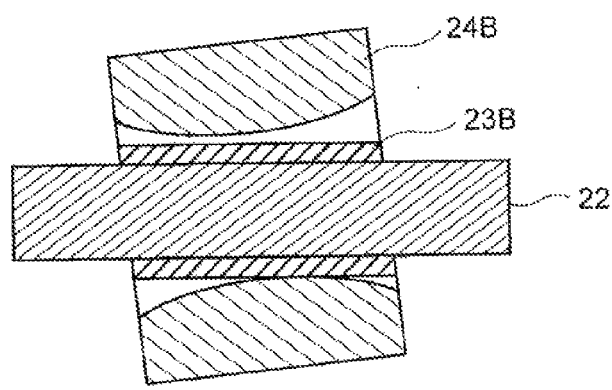
FIG. 9B is a cross-sectional view of a crowned planetary gear.
Figure 9C:
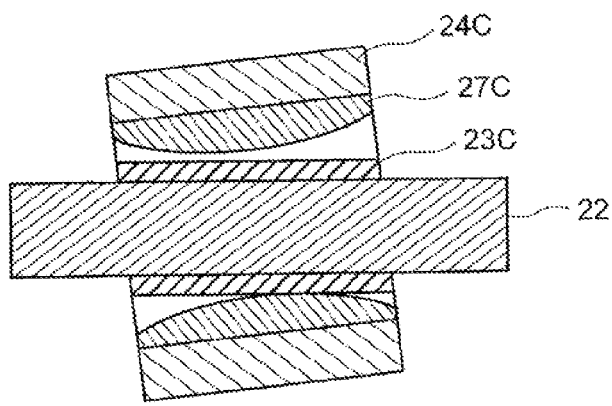
FIG. 9C is a cross-sectional view of a crowned sleeve.
Figure 10A:
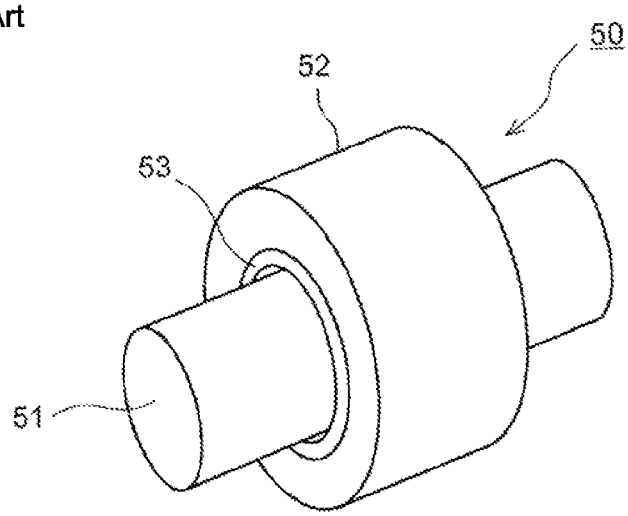
FIG. 10A is an oblique perspective figure of a conventional planetary gear and a conventional slide bearing.
Figure 10B:
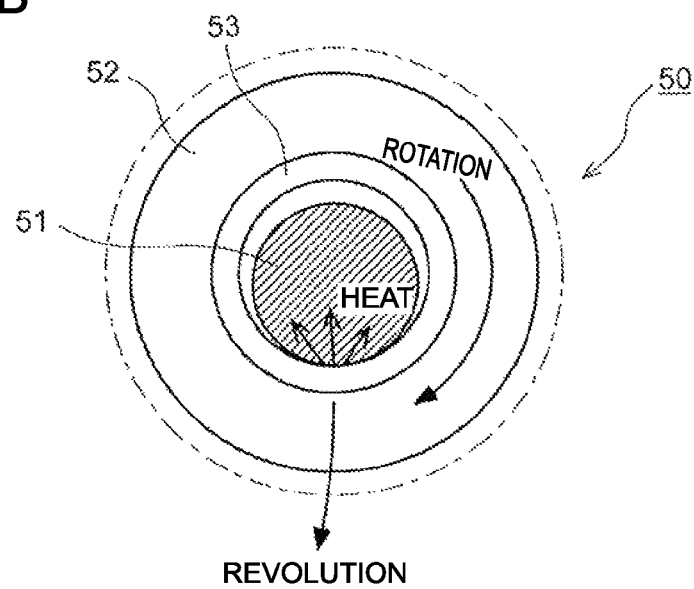
FIG. 10B is a view of the conventional planetary gear and slide bearing taken in the axial direction.

FIG. 9A through FIG. 9C are cross-sectional views of the planetary gear 24 and the slide bearing 23. FIG. 9A is a cross-sectional view of a crowned slide bearing 23A. FIG. 9B is a cross-sectional view of a crowned planetary gear 24B. FIG. 9C is a cross-sectional view of a crowned sleeve 27C.

In the case of crowning the slide bearing 23A as shown in FIG. 9A, the slide bearing 23A is crowned into an arc shape in cross-section such that both ends are thin and a center in the axial direction is thick. In this case, the sleeve 27 (see FIG. 8) may be provided in the inner periphery of the planetary gear 24A.

In the case of crowning the planetary gear 24B as shown in FIG. 9B, the planetary gear 24B is crowned into an arc shape in cross-section such that both ends of the inner periphery of the shaft hole of the planetary gear 24B in the axial direction have large diameters and a center thereof in the axial direction has a small diameter. FIG. 9B shows a slide bearing 23B with the structure substantially the same as the above embodiment.

In the case of crowning the sleeve 27C as shown in FIG. 9C, the sleeve 27C is crowned into an arc shape in cross-section such that both ends of the sleeve 27C in the axial direction have large diameters and a center thereof in the axial direction has a small diameter. FIG. 9C shows a slide bearing 23C with the structure substantially the same as the above embodiment and also shows a planetary gear 24C to which the sleeve 27C is provided.

FIG. 9A may be combined with FIG. 9B or FIG. 9C.

With the above structure, even if the planetary gear 24 inclines, it is possible to prevent the slide bearing 23 provided on the planetary pin 22 from partially contacting the inner periphery of the shaft hole of the planetary gear 24.

The invention claimed is:

1. A planetary gear unit comprising:
a ring gear;
a sun gear provided on an inner circumferential side of the ring gear;
at least one planetary gear arranged between the ring gear and the sun gear to mesh with the ring gear and the sun gear;
a planetary pin fixed to a carrier and inserted in a shaft hole of the planetary gear; and
a slide bearing arranged between the planetary gear and the planetary pin,
wherein the slide bearing is formed of a resin material, is fixed to the planetary pin, and is provided on an outer periphery of the planetary pin at least in a region where the planetary pin slides relative to the planetary gear.

2. The planetary gear unit according to claim 1, further comprising:
a metal sleeve attached to the inner periphery of the shaft hole of the planetary gear,
wherein an inner periphery of the sleeve has a surface roughness that is smaller than a thickness of an oil film of lubricating oil formed between the inner periphery of the sleeve and the slide bearing.

3. The planetary gear unit according to claim 2,
wherein at least one of an outer periphery of the slide bearing or the inner periphery of the shaft hole of the planetary gear is crowned along an axial direction of the planetary pin.

4. The planetary gear unit according to claim 1,
wherein at least one of an outer periphery of the slide bearing or the inner periphery of the shaft hole of the planetary gear is crowned along an axial direction of the planetary pin.

5. The planetary gear unit according to claim 1,
wherein the planetary gear unit is of a planetary type,
wherein the slide bearing is formed of a first part and a second part that are apart from each other,
wherein the first part and the second part of the slide bearing are disposed on an outer periphery of the planetary pin at both sides in a revolving direction of the planetary pin.

6. A wind turbine generator comprising:
the planetary gear unit of claim 1.

7. The planetary gear unit according to claim 1, wherein the planetary gear is configured to be relatively rotatable to the slide bearing.

8. The planetary gear unit according to claim 1, wherein the slide bearing contacts the planetary gear and the planetary pin.

9. A device, comprising:
a wind turbine generator, including:
a planetary gear unit comprising:
a ring gear;
a sun gear provided on an inner circumferential side of the ring gear;
at least one planetary gear arranged between the ring gear and the sun gear to mesh with the ring gear and the sun gear;
a planetary pin fixed to a carrier and inserted in a shaft hole of the planetary gear; and
a slide bearing arranged between the planetary gear and the planetary pin,
wherein the slide bearing is formed of a resin material, is fixed to the planetary pin, and is provided on an outer periphery of the planetary pin at least in a region where the planetary pin slides relative to the planetary gear.

10. The device of claim 9,
wherein at least one of an outer periphery of the slide bearing or the inner periphery of the shaft hole of the planetary gear is crowned along an axial direction of the planetary pin.

11. The device of claim 9,
wherein the planetary gear unit is of a planetary type,
wherein the slide bearing is formed of a first part and a second part that are apart from each other,
wherein the first part and the second part of the slide bearing are disposed on an outer periphery of the planetary pin at both sides in a revolving direction of the planetary pin.

12. The device of claim 9,
wherein the planetary gear is configured to be relatively rotatable to the slide bearing.

13. The device according to claim 9, wherein the slide bearing contacts the planetary gear and the planetary pin.

14. The device of claim 9, further comprising:
a metal sleeve attached to the inner periphery of the shaft hole of the planetary gear,
wherein an inner periphery of the sleeve has a surface roughness that is smaller than a thickness of an oil film of lubricating oil formed between the inner periphery of the sleeve and the slide bearing.

15. The device of claim 14,
wherein at least one of an outer periphery of the slide bearing or the inner periphery of the shaft hole of the planetary gear is crowned along an axial direction of the planetary pin.

* * * * *